(12) United States Patent
Collins

(10) Patent No.: US 8,635,074 B2
(45) Date of Patent: Jan. 21, 2014

(54) INTERACTIVE VOICE RESPONSE INTERFACE, SYSTEM, METHODS AND PROGRAM FOR CORRECTIONAL FACILITY COMMISSARY

(75) Inventor: Christopher M. Collins, O'Fallon, MO (US)

(73) Assignee: Keefe Commissary Network, L.L.C., St. Louis, MO (US)

( * ) Notice: Subject to any disclaimer, the term of this patent is extended or adjusted under 35 U.S.C. 154(b) by 1419 days.

(21) Appl. No.: 11/855,447

(22) Filed: Sep. 14, 2007

(65) Prior Publication Data
US 2009/0076823 A1 Mar. 19, 2009

(51) Int. Cl.
*G10L 21/00* (2013.01)
(52) U.S. Cl.
USPC .............. 704/275; 726/5; 705/26.1; 455/411; 379/88.11; 379/85; 379/114.21
(58) Field of Classification Search
USPC ..................................... 379/88.08
See application file for complete search history.

(56) References Cited

U.S. PATENT DOCUMENTS

| | | | | |
|---|---|---|---|---|
| 5,485,507 A * | 1/1996 | Brown et al. | | 379/88.08 |
| 5,535,261 A * | 7/1996 | Brown et al. | | 379/88.11 |
| 6,587,822 B2 | 7/2003 | Brown et al. | | |
| 6,665,376 B1 * | 12/2003 | Brown | | 379/85 |
| 7,076,032 B1 | 7/2006 | Pirasteh et al. | | |
| 7,180,985 B2 | 2/2007 | Colson et al. | | |
| 7,640,190 B1 * | 12/2009 | Sullivan et al. | | 705/26.1 |
| 7,844,252 B2 * | 11/2010 | Hodge | | 455/410 |
| 7,860,226 B1 * | 12/2010 | Falcone et al. | | 379/114.21 |
| 7,889,847 B2 * | 2/2011 | Gainsboro | | 379/88.02 |
| 7,961,858 B2 * | 6/2011 | Polozola et al. | | 379/114.21 |
| 2004/0029564 A1 * | 2/2004 | Hodge | | 455/411 |
| 2006/0126803 A1 | 6/2006 | Patel et al. | | |
| 2008/0040781 A1 * | 2/2008 | Keiser et al. | | 726/5 |

* cited by examiner

*Primary Examiner* — Douglas Godbold
*Assistant Examiner* — Mark Villena
(74) *Attorney, Agent, or Firm* — Armstrong Teasdale LLP

(57) ABSTRACT

An interactive voice response system for a correctional facility commissary is described. The system is configured to receive incoming communications from an inmate to the correctional facility commissary. The system detects violations of facility restrictions to orders for commissary goods at more than one point in time, and allows comprehensive review and editing of pending orders for commissary items.

59 Claims, 9 Drawing Sheets

INTERACTIVE VOICE RESPONSE INTERFACE, SYSTEM, METHODS AND PROGRAM FOR CORRECTIONAL FACILITY COMMISSARY

BACKGROUND OF THE INVENTION

This invention relates generally to interactive voice response systems for institutional facilities, and more specifically to interactive, voice response systems for accessing commissary services of a correctional facility.

A variety of incarceration or correctional facilities exist in which a population of persons, commonly referred to as prisoners or inmates, are confined. Such facilities may be operated by state, local and federal government entities, and may serve inmate populations of various sizes. The incarceration facility environment is subject to a number of unique administrative challenges.

For example, incarceration facilities demand a level of oversight that is not present in most other environments. Activities of inmates must be carefully monitored, and approved in advance, by facility administrators. Various types of restrictions to specified activities exist as security safeguards and as a means to promote desirable behavior among inmates, while privileges to other activities may be granted and revoked by the correctional facility. One popular privilege offered by many incarceration facilities is a commissary wherein inmates may purchase a variety of goods using spending accounts. The operating details associated with such commissaries, however, can present significant burdens on administrators of correctional facilities. Such burdens may include, as examples only, aspects of the financial accounting and management of the inmate accounts, and correct determination and application of potentially a large number of different restrictions on ordering of commissary goods that may vary considerably from inmate to inmate.

Improvements in monitoring and administering commissary services for correctional facilities are desired.

BRIEF DESCRIPTION OF THE INVENTION

In one aspect, an interactive voice response interface for accepting orders from an inmate population in a correctional facility for a group of items is provided. The items are approved by the correctional facility and offered to the inmate population by a commissary service, and the interface comprises at least one computer configured to receive incoming communications from an inmate to the commissary service, and in response to the incoming communications the computer is adapted to provide voice prompts to the inmate for ordering commissary items. The commissary is subject to applicable inmate restrictions determined by the correctional facility, wherein selected inmates are prohibited from purchasing certain items from the commissary that are otherwise available for purchase by the inmate population, and applicable inmate restrictions are applied at a first point in time during each incoming communication as the inmate submits an order for an item from the commissary, and are also applied at a second point in time. The second point in time is subsequent to the first point in time but prior to delivery of an ordered item to the inmate.

Optionally, the computer may also comprise one or more of the following features. The computer may be responsive to dual tone multifrequency signals to accept input selections from the inmate and, in response to the input selections, may provide voice prompts to the inmate. The computer also may be responsive to voice commands to accept input selections from the inmate and, in response to the input selections, provides voice prompts to the inmate. The computer may be adapted to review each submitted order and determine a status of each submitted order as valid or invalid per the applicable inmate restrictions in existence at the first point in time. The computer may be adapted to report an invalid submitted order to the inmate with explanation. Valid submitted orders for commissary items may be stored and accumulated until a predetermined time wherein the accumulated orders are each processed for acceptance, with the second point in time corresponding to the predetermined time. The computer may be adapted to review each of the accumulated orders and determine a status of each order as valid or invalid per the applicable inmate restrictions in existence at the second point in time. The computer may also be adapted to accept orders that are determined to be valid at the second point in time and to reject orders that are determined to be invalid at the second point in time. The computer may be adapted to initiate delivery of accepted orders to the inmate. In response to each incoming communication from an inmate the computer may be programmed to notify the inmate of an existence of a previous and pending order placed by the inmate. The computer may be programmed to report to the inmate a current balance of an inmate spending account for purchasing of items from the commissary service. The computer may be programmed to permit the inmate to edit a submitted order for an item without cancelling the order.

In another aspect, an interface for accepting orders from an inmate population in a correctional facility to a commissary offering approved items for purchase by the inmate population is provided. The system comprises at one least interactive voice response system configured to accept an incoming communication from an inmate for ordering of an item from the commissary, with the interactive voice response system being adapted to provide voice prompts to the inmate for ordering the item. A database may be provided and adapted to store completed orders from the inmate through the interactive voice response system until a predetermined time wherein submitted orders are processed for acceptance, with the completed order being deemed pending until the predetermined time. In response to each incoming communication from an inmate, the interactive voice response system is programmed to search the database for a pending order submitted by the inmate associated with the incoming communication, and to notify the inmate of a pending order located in the database.

Optionally, the interactive voice response system may be further programmed to: provide a prompt to the inmate to review the pending order; and when the inmate elects to review the pending order, to report the contents of the pending order for the inmate. The interactive voice response system may also be programmed to provide a prompt the inmate to edit the pending order. Additionally, the interactive voice response system may be programmed to: provide a prompt to the inmate to enter an item selection; provide a prompt to the user to enter a quantity for the selected item; and provide a prompt to the inmate to edit one of the item selection and the item quantity without cancelling the order. The interactive voice response system may be programmed to notify an inmate when an item selection corresponding to a restricted item is entered by the inmate. The commissary may be subject to restrictions determined by the correctional facility for purchasing of certain items by selected inmates, with the database including data and information corresponding to restrictions for each inmate that is eligible to order an item from the commissary, and the restrictions may be applied by the interactive voice response system at a first point in time as orders for items of the commissary are completed by an inmate using the interactive voice response system, and also applied at second point in time by the interactive voice response system, with the second point in time being prior to providing an ordered item to the inmate. The interactive voice response system may be responsive to dual tone multifrequency signals to accept input selections from the inmate and to provide voice prompts to the inmate in response to the input selections. The interactive voice response system may be responsive to voice commands to provide voice prompts to the inmate. The interactive voice response system may be programmed to report to the inmate a current balance of an inmate spending account for purchasing of available items from the commissary service.

In another aspect, an interactive voice response system for accepting orders from an inmate population in a correctional facility from a commissary offering items for purchase to the inmate population is provided. The commissary service is subject to restrictions determined by the correctional facility on purchasing of certain items by selected inmates. The system comprises a processor based device, and an interactive voice response module coupled to the processor based device and configured to accept an incoming communication from an inmate for submitting an order for an item from the commissary. The interactive voice response module is adapted to provide voice prompts to the inmate for an item selection and an item quantity. A database is coupled to the processor based device and to the interactive voice response module, with the database containing data and information corresponding to the restrictions for purchasing of certain items by selected inmates and the database including inmate identifier data for each inmate that is eligible to order items from the commissary. The processor based device is programmed to compare an inmate identifier collected via the interactive voice response module to data and information in the database corresponding to restrictions for the inmate corresponding to the collected inmate identifier, and when a collected item is subject to a restriction, to notify the inmate, via the interactive voice response module, of the restriction.

Optionally, the processor based device may be programmed to, at a first point in time and also at a second point in time subsequent to the first point in time, compare an inmate identifier collected via the interactive voice response module to data and information in the database corresponding to restrictions for the inmate corresponding to the collected inmate identifier, wherein the second point in time coincides with acceptance of the order for delivery of the item to the inmate. The interactive voice response module may be responsive to dual tone multifrequency signals to accept input selections from the inmate and to provide voice prompts to the inmate corresponding to the input selections. The interactive voice response module may be responsive to voice commands to accept input selections from the inmate and to provide voice prompts to the inmate corresponding to the input selections. The system may be programmed to permit the inmate to edit an order without cancelling the order. Submitted orders for item selections and item quantities collected from the interactive voice response module may be stored in the database as pending orders until a predetermined time selected by the correctional facility to process pending orders for acceptance and delivery of ordered items. The processor based device may be programmed to compare, with each incoming communication from an inmate, an inmate identifier collected via the interactive voice response module with pending orders stored in the database, and if the inmate identifier matches one of the pending orders, to notify the inmate via the interactive voice response module of the pending order. The processor based device may be further programmed to prompt the inmate via the interactive voice response to review the pending order, and may be programmed to prompt the user via the interactive voice response module whether to add an item to the stored order, or to prompt the user via the interactive voice response module whether to edit the pending order without canceling the order.

In another aspect, a method of processing orders received from an inmate population in a correctional facility for items offered by a commissary using an interactive voice response interface and a database is provided. The purchase of items from the commissary are subject to restrictions determined by the correctional facility to prevent selected inmates from ordering certain items, and the restrictions are subject to change over time. The method comprises: collecting orders for items from inmates using the interactive voice response interface; applying the restrictions as the orders are collected to determine whether the collected orders are valid or invalid; storing the collected orders that are determined to be valid as pending orders in the database until a predetermined time selected by the facility for reviewing of the pending orders; applying the restrictions to the pending orders at the predetermined time to determine whether the pending orders are valid or invalid; accepting the pending orders that are determined to be valid; and processing the accepted orders for delivery of ordered items to the inmate.

Optionally, the method may further comprise: prompting each inmate to enter an identifier as each order is collected; comparing the identifier to the pending orders; if a pending order is found that matches the identifier, notifying the inmate of a pending order; and permitting the inmate to modify the pending order if desired. Modifying the pending order may comprise one of: deleting an item from the pending order; adding a new item to the pending order; and changing an item quantity in the pending order. The method may also comprise applying the restrictions when an item quantity is changed in a pending order; and notifying the inmate when a restriction prohibits the changed item quantity. The method may also comprise permitting the inmate to edit a collected order without cancelling the collected order.

In another aspect, a computer program embodied on a computer readable medium for processing orders for items from a commissary by inmates in a correctional facility is provided. The program comprises at least one code segment that: receives user provided selections for items offered by the commissary, and; in response to the received selections, evaluates the received selections in light of correctional facility restrictions on purchases of certain items from the commissary by selected inmates at the time that orders are received; accumulates orders that are received that do not violate the restrictions until a designated time that orders are processed for acceptance and delivery; and evaluates, at the designated time, the stored orders in light of the correctional facility restrictions.

Optionally, the program may further comprise one or more of the following: at least one code segment that permits modification of a stored order; at least one code segment that reports an accumulated order to the inmate; at least one code segment that allows editing of an order without cancelling the order; at least one code segment that explains a restriction violation to an inmate; and at least one code segment that reports a current spending account balance to an inmate. The code may implement an interactive voice response interface, and the code may be responsive to dual tone multifrequency signals. The code may also be responsive to voice commands.

In still another aspect, an interactive voice response interface for accepting orders from an inmate population in a correctional facility for a group of items is provided. The items are approved by the correctional facility and offered to the inmate population by a commissary service. The interface comprises at least one computer configured to receive incoming communications from an inmate to the commissary service, and in response to the incoming communications the computer is adapted to provide voice prompts to the inmate for ordering commissary items. Orders for commissary items are held from a time of submission until a predetermined time when the orders are processed for final acceptance and delivery. The commissary is subject to applicable inmate restrictions determined by the correctional facility, wherein selected inmates are prohibited from purchasing certain items from the commissary that are otherwise available for purchase by the inmate population; and the applicable inmate restrictions are applied at the predetermined time and the orders are determined to be valid or invalid.

Optionally, the applicable inmate restrictions may also applied to the orders at the time of submission, and the computer may be responsive to dual tone multifrequency signals. The computer may also be responsive to voice commands.

BRIEF DESCRIPTION OF THE DRAWINGS

FIGS. 4-9 illustrate portions of an exemplary script algorithm for an exemplary embodiment of the system and processes shown in FIGS. 1-3; wherein:

FIG. 4 illustrates a logon and initialization script portion and processes;

FIG. 5 illustrates a main menu script portion and processes;

FIG. 6 illustrates an add item script portion and processes;

FIG. 7 illustrates a review request script portion and processes;

FIG. 8 illustrates a delete request script portion and processes; and

FIG. 9 illustrates an end call script and processes.

DETAILED DESCRIPTION OF THE INVENTION

Figure 1:
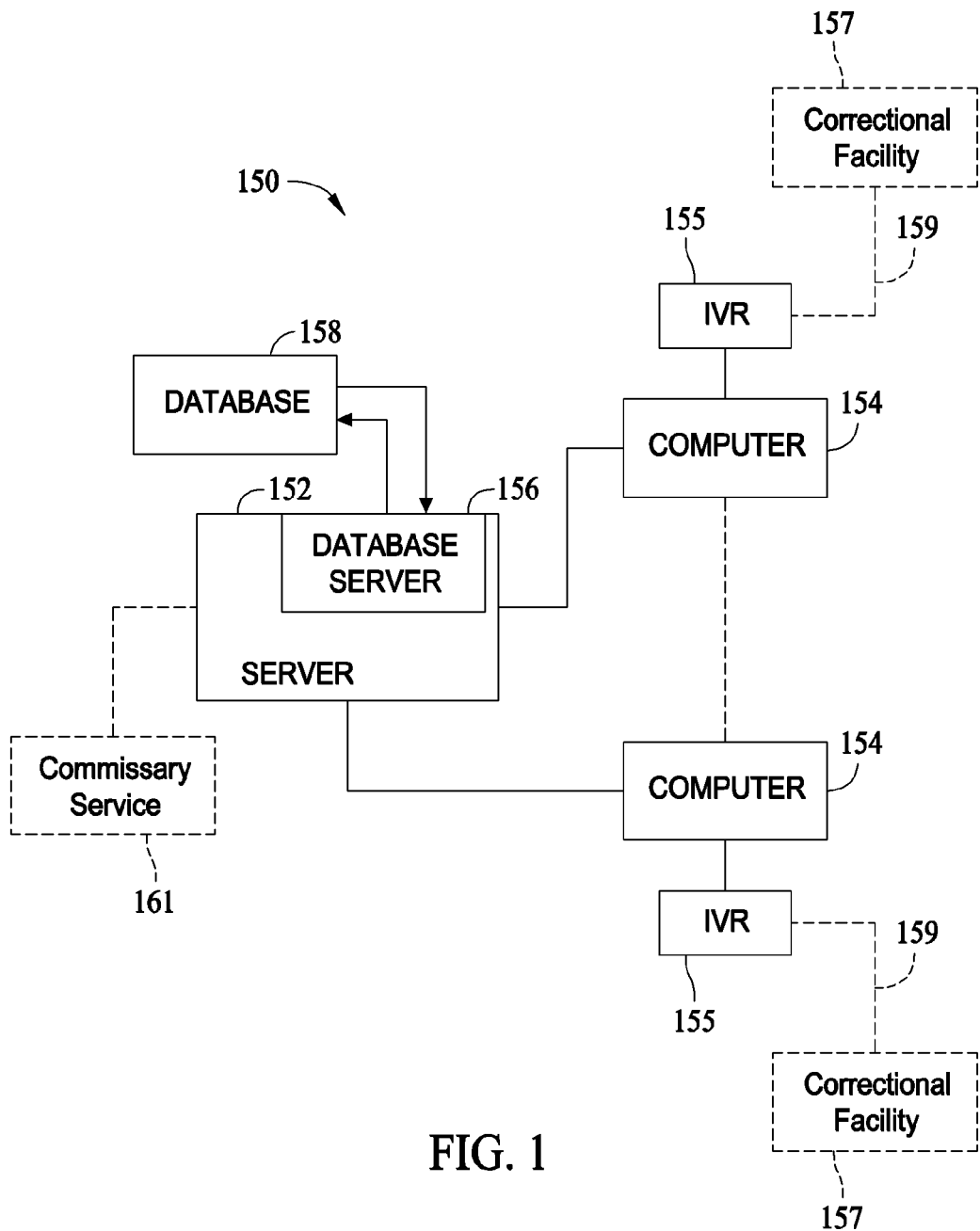
FIG. 1 is a simplified block diagram of an exemplary embodiment of an interactive voice response system for processing commissary orders from inmates in a correctional facility.

Exemplary embodiments of interactive voice response (IVR) interfaces, methods, systems and programs for administering commissary systems for inmate populations in correctional facilities are disclosed hereinbelow. In various aspects the inventive interface, methods, systems, and programs advantageously process and manage inmate orders for goods and services from a commissary system for the correctional facility. Among other things, the inventive interfaces, methods, systems and programs facilitate efficient processing of orders for commissary goods and accurate and timely application of restrictions for the members of an inmate population, facilitate modification of new and existing orders placed by inmates, and facilitate communication to inmates regarding restrictions applied by the commissary facility to orders for commissary goods. Enhanced order entry and order modification capability is provided over a telephone interface in one embodiment, with greater accuracy and control over implementing applicable restrictions to inmate orders from the commissary.

In order to appreciate the invention to its fullest extent, the following disclosure will be divided into different parts or segments, wherein Part I discusses particular problems associated with existing IVR interfaces for commissaries of incarceration facilities; Part II discloses an exemplary system for addressing the problems discussed in Part I; and Part III discloses exemplary processes utilized by the system of Part II to achieve its advantages.

I. Introduction to the Invention

Many correctional facilities offer commissary services that are accessible to inmates and prisoners. The commissary services allow inmates and prisoners to purchase a variety of goods using inmate accounts that may be funded, for example, by the inmates themselves, or by friends and relatives of the inmates. Items ranging from food and beverage items to personal hygienic items, and even entertainment items and electronic devices, may be ordered from commissary facilities that may be locally based on-site at the correctional facility or remotely located from the correctional facility.

Historically, available items have been presented to the inmates using hard copy catalogues and the like, and orders for goods and services were entered by hand on paper by a commissary representative using standardized order forms, with the paper order forms typically being forwarded to another person or persons for approval and processing. Such paper-based transaction systems are slow and inefficient, especially for larger inmate populations having significant turnover and change of individuals in the population.

Additionally, certain inmates may be restricted, on an individual or group basis, from obtaining certain items through the commissary. Access to the commissary, or to certain types of the goods offered by the commissary, are typically deemed a revocable privilege by the correctional or incarceration facility. For example, inmate restrictions to commissary goods may be permanently assigned for security reasons or for health reasons to certain types of prisoners, as determined by each correctional facility on an individual or class basis. Other restrictions may be applicable for indefinite time periods, but are not necessarily permanent such that it is possible at some point that inmates may be assigned a different set of restrictions, either more or less restrictive than before. Still other restrictions may be more temporary in nature and may be applied for relatively short time periods in response to, for example, undesirable behavior of inmates, violations of facility rules, or for other non-disciplinary reasons. Permanent, indefinite, and temporary restrictions may exist for an inmate at any given time, and accurately tracking and applying the current state of restrictions for each inmate as commissary orders are made, especially for large inmate populations, is cumbersome.

At least in part to address such concerns, automated computer-implemented interactive voice response (IVR) systems have been developed wherein inmates may order commissary goods using a telephone interface. Using such systems, the inmates are prompted with voice menus to guide inmates through the ordering process, and item selections are input to the system by the inmate using the numeric keypad of the phone. Such systems are beneficial in that paper processing of orders may be eliminated in favor of electronic processing, and restrictions may be applied electronically instead of manually. Known IVR systems of this type, however, are not completely satisfactory from the perspective of either the inmate populations or the administrators of the correctional facilities.

For example, when ordering goods from a correctional facility commissary using existing automated IVR systems accessed by the inmates via telephones, inmates must typically obtain item numbers from a hardcopy catalog, list, or other source, and then enter the item number for desired items via the numeric keypad of the telephone. Because orders are made through a phone interface using numeric product codes and the relatively small numeric keypad of the phone, it is quite easy to misread numeric product codes and/or to mistakenly enter an incorrect product code when ordering items. Moreover, such mistakes are not always easy to detect or correct by the inmate at the time of ordering or alternatively to detect and correct by the facility. Similar mistakes may also easily occur when entering desired item quantity information for desired items via the numeric keypad of the phone.

As another example, an inmate using a known telephone interface to a commissary is typically asked to confirm or delete an order after one is made. However, the inmate generally has no ability to edit the items, or the quantities of those items, which make up an order to correct a mistake if the inmate realizes that one has occurred. Consequently, the inmate must delete an order having a mistake and start over with the entire order. This can be particularly frustrating when an inmate attempts to order several items in a single call, but mistakenly enters the wrong item number or quantity number for one of the last items to be ordered, in which case the inmate typically has to choose between accepting the incorrect order or to cancel the order and start over to re-submit the entire order. When re-submitting the order after cancelling the mistaken one, the inmate must re-enter item numbers that were correctly entered the first time, as well as re-entering mistaken entries to correct them.

Still further, mistaken orders may occur using known IVR systems when an inmate inadvertently submits an order that duplicates an order previously made. This may occur when an inmate forgets a previous order placed, or when an inmate is confused regarding whether an attempt to order an item or items was received or accepted by the system. In either case, an inmate in need of a particular item may submit an original order for the item at one time, and at a later time, ranging from shortly after the original order was placed to several days or more, submit one or more duplicate orders for the same item. A similar situation may arise when an inmate mistakenly thinks or assumes that he or she deleted the original order and later calls to submit it again, when in fact the original order was not deleted and has been accepted by the system. Some delay between order submittal and receipt of the goods is typically to be expected, but it may often be difficult for inmates to track what they ordered, when it was ordered, and the status of submitted orders. As a result, correctional facility administrators may be frequently bombarded with questions and complaints regarding what inmates perceive to be unexpected duplicate orders and charges from their accounts.

Also, some orders made through known systems may be denied, correctly or incorrectly, due to correctional facility restrictions for commissary purchases. Denial of orders is typically made without explanation to the inmate, leading to questions and concerns that administrators must address.

Any of the foregoing errors in ordering items from a commissary, and any confusion that may result from attempts to order commissary goods, implicate problems and present burdens associated with the inmate spending accounts for purchasing commissary goods, and also in handling the goods themselves. Charges for goods ordered by mistake, double charges for duplicate orders that were not intended, return of unwanted goods and crediting the inmate accounts accordingly, and other issues with the deposit accounts that are attributable to limitations and disadvantages of existing IVR systems used with correctional facility commissaries, all require facility time and resources of the correctional facility to explain to inmates how the charges arose, to correct the charges if necessary, to resolve any account balance disputes, and to return and account for all goods distributed. With the resources of many correctional facilities already being limited, such expenditures of correctional facility resources is perhaps better spent elsewhere than on issues such as these.

Also, conventional IVR systems that apply correctional facility purchase restrictions solely at the time that items are ordered by inmates can lead to unintended consequences. It is possible with existing systems, for example, for an inmate to order items at one point in time while one set of restrictions are in place for the inmate, with the items being received at a later point in time when a different and more restrictive set of restrictions is in place for the inmate. Additionally, existing systems may be particularly susceptible to such problems when a time delay of several days or longer may pass between order submission and actual receipt of the ordered items, a sufficient period of time for the amount and nature of correctional facility restrictions to commissary purchases for any particular inmate to potentially change considerably. This renders existing systems vulnerable to conscious manipulation by inmates with an aim to cleverly thwart correctional facility restrictions.

Finally, another unintended consequence of conventional IVR systems that apply correctional facility purchase restrictions solely at the time that items are ordered by inmates is a rush to submit orders at a time prior to a delivery of commissary purchases. For example, inmates submit orders into an IVR system at any time they are given permission, however, those orders may not be processed until a set date and time. This enables the orders to be processed in a batch. If purchase restrictions are solely applied at the time that items are ordered by inmates, inmates may rush to place an order just prior to the date the orders are processed. This allows an inmate to exhaust a maximum amount of funds in their spending account prior to each processing date. This heightened demand to submit orders just prior to processing of the orders may cause insufficient access to telephone interfaces at those times, especially when there are a limited number of telephone interfaces at the facility.

Improvements to known IVR systems for correctional system facilities that address these and other problems in the art are desirable.

II. Exemplary Systems of the Invention

FIGS. 1-9 illustrate aspects of an exemplary interactive voice response (IVR) interface system 150 that more capably meets the needs of inmates and administrators of correctional facilities, while avoiding certain problems of existing systems, and vulnerabilities to certain problems of existing systems, some of which are discussed above in Part I.

The system 150 in one embodiment is a computer program or software embodied on a computer readable medium and utilizing, for example, a Structured Query Language (SQL) with a client user interface front-end for administration and an IVR interface, described below, for user input, access, and information retrieval. The system 150 may be web enabled and may be run on a business-entity intranet or alternatively may be fully accessed by individuals having an authorized access outside the firewall of the business-entity through the Internet. In an exemplary embodiment, the IVR interface system 150 may be run in a Windows® NT environment or operating system that is commercially available from Microsoft Corporation of Redmond, Wash. The application may be flexible and designed to run in various different environments without compromising any major functionality.

As shown in FIG. 1, in an exemplary embodiment of the IVR interface system 150 the system includes a server system 152, and a plurality of client sub-systems, also referred to as client systems 154, connected to the server system 152. Computerized modeling and grouping tools are stored in the server system 152 and can be accessed by a requester at any one of the client systems 154. In one embodiment, the client systems 154 are computers or other processor-based electronic devices including a web browser, such that the server system 152 is accessible to the client systems 154 using, for example, the Internet.

The client systems 154 may be interconnected to the Internet through many interfaces including, for example, a network such as a local area network (LAN) or a wide area network (WAN), dial-in-connections, cable modems and special high-speed ISDN lines. The client systems 154 may be, for example, a personal computer, a laptop computer or other processor-based devices capable of connecting to the Internet Each client system 154 further is provided with an IVR interface module 155 that is linked to a correctional facility 157 (shown in phantom in FIG. 1) via a communications network 159 (also shown in phantom in FIG. 1).

In accordance with known IVR systems, the IVR interface module 155 serves as a front end interface through which a calling party or caller, such as in inmate in the correctional facility 157, can access the system 150 for data processing of orders from a commissary service 161 offering items for purchase to the inmates. Many items are typically offered by the commissary service 161, including but not limited to food and beverage items, personal hygienic items, clothing items, entertainment items, electronic devices, and other items that are typically grouped and categorized in a catalogue, list or other source that is made available to inmates for ordering items. A large number of items are often available from the commissary service 161 at various price points. In different embodiments, the commissary service 161 may be locally based on-site at the correctional facility, or may be remotely located from the correctional facility and operated as a virtual commissary of the correctional facility. The commissary service 161 may be operated by the correctional facility or by a third-party vendor in different embodiments.

The IVR module 155 may be a known IVR element in the form of, for example, a telephone interface card that is connected to one or more of the client systems 154. The IVR module 155 is configured to provide voice prompts to the caller and to receive inputs from the caller, such as dual tone multifrequency (DTMF) signals, sometimes referred to as touch tone signals, and/or spoken responses/voice commands from the inmate caller. Through prompt response and interaction with the caller, the IVR interface module 155 collects input selections from an inmate caller, presents options to the inmate caller, queries the system 150, or the like as explained below. As appropriate, and depending on the level of sophistication of the IVR module 155, the IVR module may include hardware and software components associated with speech synthesizers, speech recognizers, script engines, IVR engines, and other technologies that are believed to be well known to those in the art. Further explanation of the IVR module is therefore not believed to be necessary, except insofar as the programming is concerned to implement the features described in some detail below.

In accordance with known IVR systems, the IVR module 155 includes a hierarchical menu formed of an ordered series of audio prompts, whether recorded audio and/or text-to-speech programming. Each prompt is associated with a listing of choices available to the caller at that particular location within the menu hierarchy. The caller can navigate the menu hierarchy by making selections, and responsive to a caller input, the IVR system traverses the menu hierarchy to the particular selection that was chosen or indicated by the caller's input. In this manner, the IVR module 155 enables the caller to traverse the menu hierarchy to order goods and items from the commissary 161.

The communications network 159 linking the correctional facility 157 to the IVR module 155 can be implemented as, or may include, a Wide Area Network (WAN), a Local Area Network (LAN), the Public Switched Telephone Network (PSTN), a premise-based telephone network, the Internet, an intranet, wireless telephony networks, Internet Protocol (IP) telephony, Session Initiation Protocol (SIP) networks, and the like.

The system 150 also includes a database server 156 connected to a database 158 including data and information on a variety of matters, as described below in greater detail. In one embodiment, the database 158 is centralized and stored on the server system 152, and the database 158 may be accessed by potential users at one of the client systems 154 by logging onto the server system 152 through one of the client systems 154. In an alternative embodiment, the database 158 may be stored remotely from server system 152 and may be non-centralized.

Figure 2:
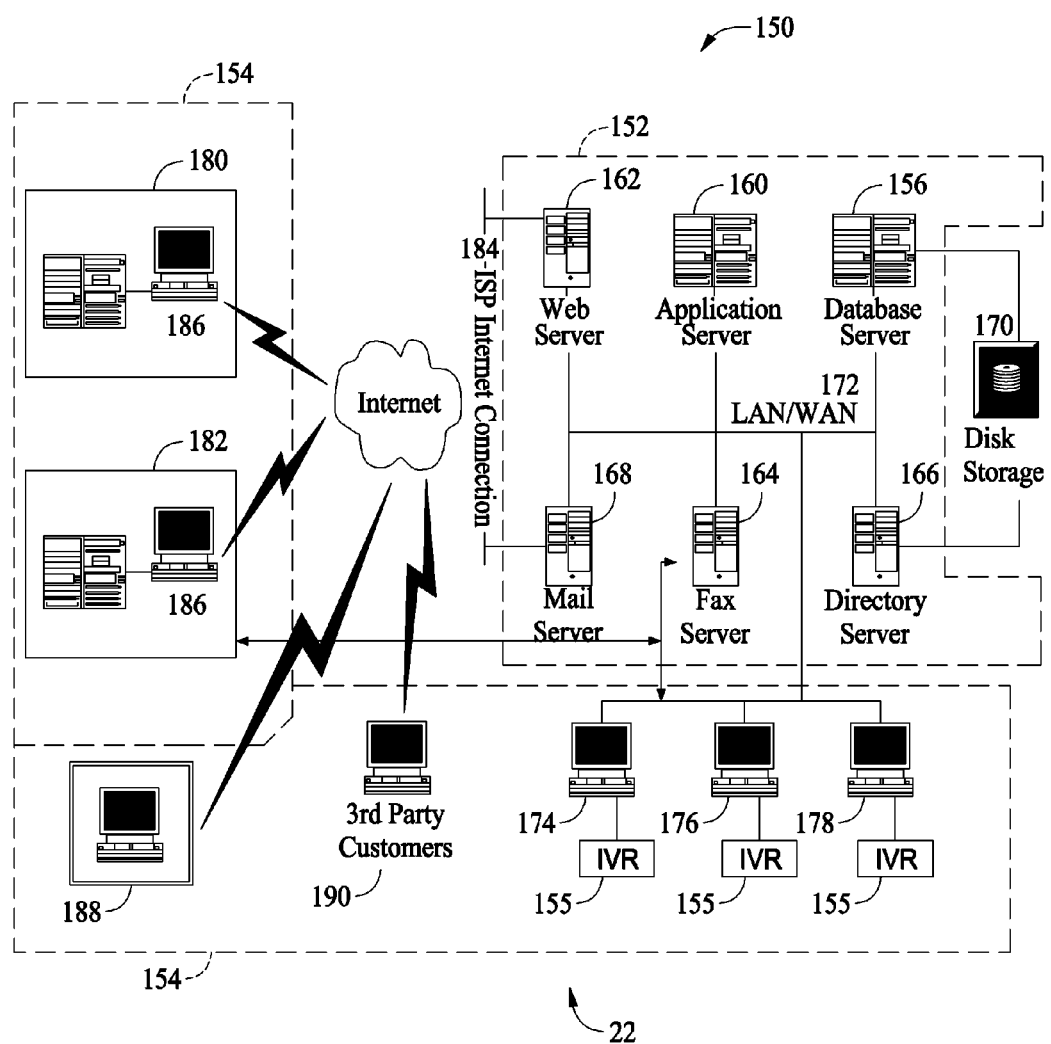
FIG. 2 is an expanded block diagram of an exemplary embodiment of a server architecture of the system shown in FIG. 1.

FIG. 2 is an expanded block diagram of an exemplary embodiment of a server architecture of the IVR interface system 150 including the server system 152 and the client systems 154. The server system 152 may include the database server 156, an application server 160, a web server 162, a fax server 164, a directory server 166, and a mail server 168. A disk storage unit 170 may be coupled to the database server 156 and the directory server 166. The servers 156, 160, 162, 164, 166, and 168 may be coupled in a local area network (LAN) 172. In addition, a system administrator's workstation 174, a user workstation 176, and a supervisor's workstation 178 may be coupled to the LAN 172. Alternatively, workstations 174, 176, and 178 may be coupled to LAN 172 using an Internet link or connected through an intranet.

Each workstation 174, 176, and 178 may be a personal computer or other electronic device having a web browser. Although the functions performed at the workstations typically are illustrated as being performed at respective workstations 174, 176, and 178, such functions may be performed at one of many personal computers coupled to the LAN 172. Workstations 174, 176, and 178 are illustrated as being associated with separate functions only to facilitate an understanding of the different types of functions that can be performed by individuals having access to the LAN 172.

The server system 152 in one embodiment is configured or adapted to be communicatively coupled to various individuals via some of the client systems 154, including employees 180 associated with the interface system 150 and/or the commissary service 161 (FIG. 1), and potentially to third parties 182 in communication with the server system 152 using, for example, an ISP Internet connection 184. The communication in the exemplary embodiment is illustrated as being performed using the Internet, however, any other WAN type communication can be utilized in other embodiments. That is, the IVR interface system 150, and its operating algorithms and processes described below are not limited to being practiced using the Internet.

In an exemplary embodiment, any authorized individual having a workstation 186, 188 can access the server system 152 via one of the client systems 154. At least one of the client systems 154 includes a manager workstation 188 located at a remote location. Workstations 186 and 188 may be personal computers or other electronic devices having a web browser.

Additionally, third party customers, such as correctional facility administrators may communicate with the server system 152 via a workstation 190 having, for example, a web browser.

The fax server 164 may communicate with remotely located client systems 154, including the workstations 186, 188 and 190. The fax server 164 may be configured or adapted to communicate with other client systems including but not limited to the workstations 174, 176 and 178 as well for reporting purposes. The workstations 174, 176 and 178 may each be provided with an IVR module 155 that an inmate in the correctional facility 157 may access over the communications network 159 (FIG. 1). It is understood that, while three workstations and three IVR modules are illustrated in FIG. 2, greater or lesser numbers of workstations and IVR modules may be provided in another embodiment.

The system database 158 (FIG. 1) includes data and information pertaining to the commissary service 161 and the correctional facility 157 (also shown in FIG. 1) needed to process orders placed by inmates using an IVR module 155 as explained below. In a further and/or alternative embodiment, however, some or all of the data and information for the commissary service and the correctional facility may be contained in memory storage of the workstations 174, 176, 178 and 190 that may be local to the correctional facility. The workstations 174, 176, 178 and 190 may communicate with the system database, and vice versa, to synchronize the database and the local workstations for optimal operation of the system 150.

Using the data and information for the commissary service and the correctional facility, the system 150 may make appropriate queries and report certain events to the inmate caller in a timely, efficient, and accurate manner. The functionality and programming of the system is explained in detail below with respect to the methods and processes described below in Part III.

III. Exemplary Systems, Methods, and Processes

The technical effect of the processes and systems described herein is achieved when data and information pertaining to a correctional facility, and when data and information regarding the commissary service is entered, transmitted, downloaded or otherwise accepted by the IVR interface system 150. The data and information used by the IVR interface system 150 may be supplied and accepted through any of the workstations connected to the server system 152 as described above, or may be supplied from other sources if desired. Exemplary data and information utilized by the system is described in some detail below.

The data and information supplied to the system 150 may be stored or archived in the aforementioned server system 152 and/or may be stored in any of the client systems 154, and the data and information may be accessed by the system 150 to provide efficient and accurate processing of orders from the commissary service, while avoiding certain problems known in the art, some of which are described above in Part I.

As will become evident below, the IVR interface system 150 is operable in an interactive manner in response to inmate inputs and selections, and the system applies correctional facility restrictions in a manner that ensures that applicable restrictions to commissary orders are followed at the time of product orders and at a time subsequent to the time an inmate places an order but prior to delivery of the ordered items. In certain exemplary embodiments, orders are collected for a week before being submitted to the commissary. Once submitted to the commissary, another time period may run, from the time the orders are submitted to the commissary to the time of actual delivery of the items to the inmate. In certain exemplary embodiments, the time from when orders are submitted to the commissary to the time of actual delivery of the items to the inmate may be less than twenty-four hours, and in other embodiments, maybe be from twenty-four to forty-eight hours. By applying restrictions at a time subsequent to order placement by an inmate but prior to delivery of the ordered items, the last restrictions applied will be more current than the restrictions applied at the time the inmate placed the order.

Inmate errors and confusion using the interface are substantially avoided by allowing inmates to correct orders without cancelling them and starting over. The system further eliminates confusion by notifying inmates of pending, previously submitted orders when the inmates access the system and provides an option to the inmate to modify or edit a pending and previously submitted order. In certain circumstances, the system also notifies inmates of restrictions that prohibit certain orders, and explains the prohibition to the inmate. Other advantages of the systems are in part explained and are in part apparent from the description below.

An order, as used herewithin, is a selection of an individual item and a quantity of that item. The pairing of selected item and quantity of that item provides the information necessary to fulfill an order. Using the IVR interface system 150, an inmate has the ability to submit a single order or a series of orders. The system is able to reject or accept orders, which includes the ability to reject or accept individual item/quantity pairs.

Figure 3:
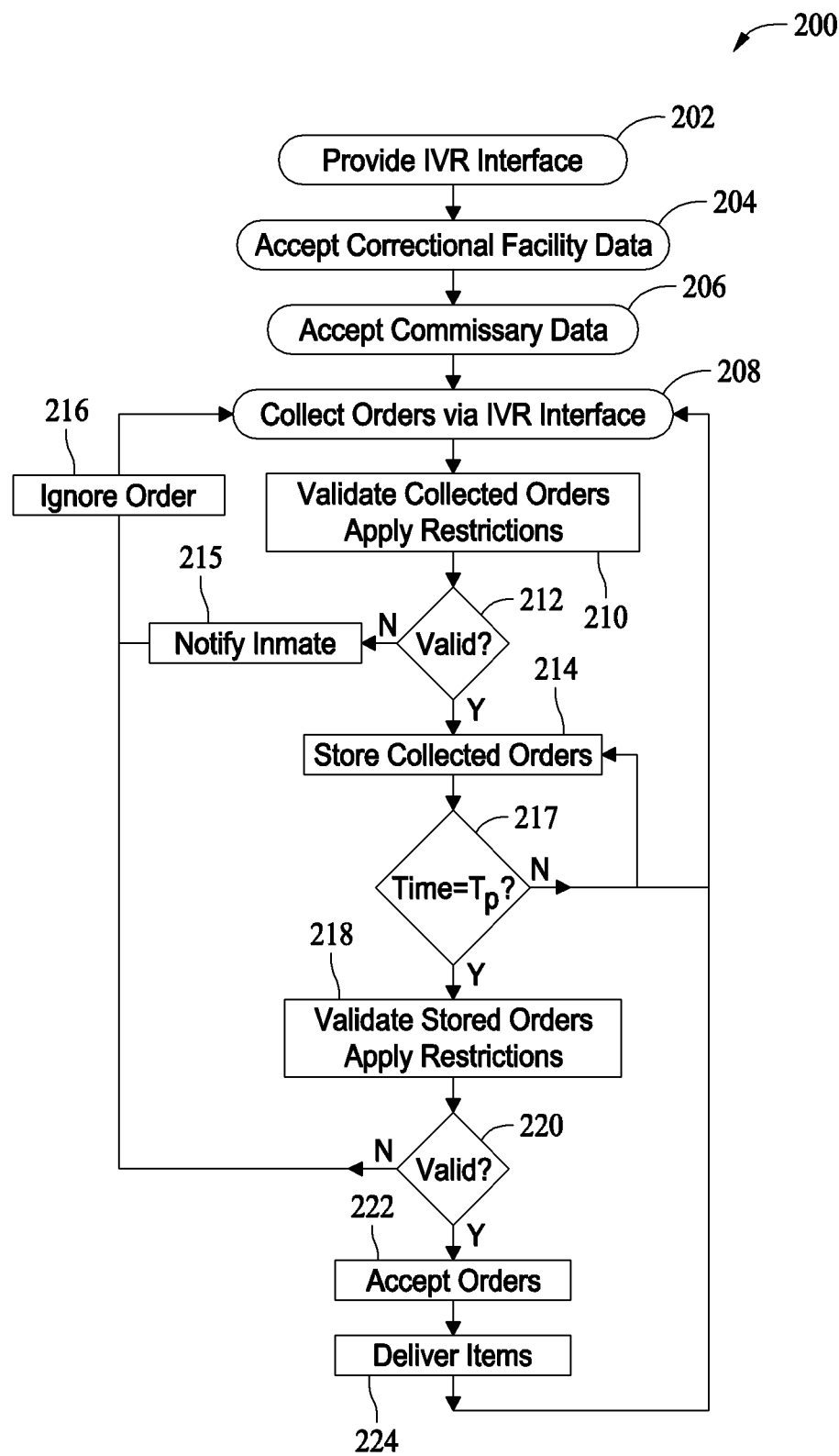
FIG. 3 is a method flowchart of processes executed by the system shown in FIGS. 1 and 2.

FIG. 3 is an exemplary method flowchart of processes 200 executed by the system 150 shown in FIGS. 1 and 2. The process 200 may begin by providing the system and connecting the correctional facility to the commissary service through the system. Also preparatory to operation of the system, certain data and information is supplied to the system in steps 204 and 206 wherein data and information for the correctional facility and for the commissary service, respectively, is collected and accepted by the system.

The correctional facility data and information may include, for example only, inmate identifiers and passwords used to access the system and to track orders and purchases by inmates, inmate profiles and contact information, addresses for delivery of ordered items, inmate spending account numbers and details, correctional facility identifiers and contact information, data and information pertaining to correctional facility restrictions to purchases for each inmate, and other data pertinent to the system. The correctional facility data and information may appropriately grouped and may be transferred to the system from the correctional facility or from a remote location.

Correctional facility restrictions to commissary purchases may include, among other things, item restrictions and quantity restrictions for goods offered by the commissary. Item restrictions and quantity restrictions may be made within the discretion of the facility. For example, the commissary may potentially offer a vast selection of items, with the facility designating only a portion of the items as approved by the facility for purchase by inmates, with no inmate being able to purchase a non-approved item. Item restrictions may further be instituted to prevent or prohibit selected inmates from ordering or receiving certain items while allowing other inmates to order or receive the same items. Quantity restrictions may be instituted for orders of certain items that are unobjectionable within specified quantity limits.

Item and quantity restrictions may be determined by the correctional facility on a class basis or an individual basis. For example, a class-based restriction may be defined in whole or in part based upon factors such as gender, age, and health of an inmate. In this manner, and as examples only, male inmates may be prevented from purchasing female clothing items through the use of appropriate restrictions, younger inmates may be prevented from ordering certain items that are available to older inmates, and diabetics may be prevented from ordering certain foods that may raise health issues. Class-based item and quantity restrictions may also be based on monetary considerations, wherein the correctional facility may place different spending limits on different inmates depending upon their ability to pay for ordered items. Still further, class-based restrictions may also relate to inmate status such as violent or non-violent offender status or for other security reasons. Other class-based restrictions are possible and are within the discretion of the facility.

Individual-based restrictions may be applied by the correctional facility in response to specific behavior by an inmate or in response to other events. For example, in response to vandalism in the correctional facility, inmates responsible for the vandalism may be restricted or suspended from ordering from the commissary altogether for a period of time, or may be restricted from ordering certain items that, absent the vandalism event and associated restrictions that have been applied in consequence thereof, the inmate would otherwise be able to purchase. Individual-based restrictions may also be adopted by the correctional facility to address specific violations of facility rules, or for other reasons including health and well being of specific inmates. For example, restrictions to prevent ordering of certain foods and items that an inmate is known to have allergic reactions to may be appropriate. As yet another example, restrictions may be removed as a reward to certain behaviors or events, and may be applied on an individual basis for the correctional facility to motivate and provide incentives to certain types of conduct. Other individual-based restrictions are possible and are within the discretion of the correctional facility.

It is contemplated that the correctional facility could implement restrictions to commissary purchases entirely on a class basis, entirely on an individual basis, or with a blend of class-based and individual-based restrictions. Regardless, the restrictions may be assigned codes and identifiers that are recognized by the system for appropriate processing of orders submitted by inmates. A large number of different restrictions may be accommodated by the system to capably accommodate large inmate populations and correctional facilities having different needs.

Individual and class-based restrictions may be permanent, indefinite, or temporary in nature. For example, a gender-based restriction would be permanent in nature. An offense-based inmate status as violent or non-violent may be indefinite and subject to change at some point in time. Behavior-based restrictions would be temporary and would usually expire in a relatively short period of time. Any changes in correctional facility restrictions, or assignment of restrictions to an inmate class or to individual inmates, may be input to and accepted by the system as part of the step 204 in more or less real time as changes, adjustments, and assignments of correctional facility restrictions. Also, inmate information changes and adjustments in the correctional facility data and information are considered to be an ongoing part of the step 204 as inmates are brought into the correctional facility, released from the correctional facility, or transferred to another facility. Changes and updates to the correctional facility data and information would also be appropriate upon death of an inmate, transfer of inmates to new or different cells or locations in the correctional facility, or for new hires or assignment of different facility administrators to oversee the commissary service.

The data and information for the commissary service accepted at step 206 may include, as examples only, product codes and identifiers for items offered by the commissary, product descriptions for each item offered by the commissary, price information for each item offered by the commissary service, manufacturer and supplier information items offered by the commissary service, accounting information for the sale of commissary items, spending account information for each inmate that is eligible to use the commissary service, inventory information and location of inventoried items that are available for purchase, and routing and contact information for delivery of accepted orders for items. Other information pertinent to the commissary service may also be collected and accepted by the system, and like the correctional facility data and information, the commissary data and information may be subject to ongoing update and change as part of the step 206. For example, the introduction of new commissary items, elimination of existing commissary items, price changes in any current item in the commissary item lineup, would necessitate acceptance of updated commissary data and information at step 206.

Once the requisite data and information is accepted by the system at steps 204 and 206, the system may proceed to collect orders from inmates for commissary items at step 208. As orders are submitted and collected, they are validated for compliance with applicable correctional facility restrictions at steps 210 and 212. More specifically, the system compares a submitted order to item and quantity restrictions in place for the inmate making the order. If a submitted order does not violate item or quantity restrictions, the order is determined to be valid, and the system stores the submitted order at step 214. Optionally, the system may also check for a spending account balance sufficient to pay for the ordered items before the system stores the submitted order at step 214. A valid submitted order is deemed to be a pending order, which may also be referred to as an order request, for the purposes of the system, and the order purchase total is reserved from the inmate's spending account pending final approval of the order as explained below.

If at step 212 a submitted order violates item or quantity restrictions of the correctional facility, it is determined to be an invalid order. For invalid orders, the system notifies the inmate 215 that the order is invalid, perhaps with information regarding the actual restriction that was violated. Additionally, an invalid order is rejected and ignored by the system at step 216 and the system returns to collect another order. That is, the system does not undertake further processing of invalid orders once they are determined to be invalid. The system may, however, log invalid order requests for analysis purposes as an indicator of system performance or as a monitoring tool for inmate activity on the system.

In an exemplary embodiment, valid orders are stored and accumulated as pending but unapproved orders at step 214 until a predetermined time when all the pending orders are processed as a batch or group for final approval and distribution by the commissary service. The predetermined time may be selected by the correctional facility, and may be for example, a recurring day and time on a weekly basis. For example, orders may be collected over the course of a week before being processed by the commissary service for delivery. Cost savings may be realized by processing pending orders as a batch and shipping, handling, or distributing accepted orders in a group. Optionally, either in combination with, or in place of a recurring day and time for distribution by the commissary service, a facility may initiate processing of a batch of orders for final approval and distribution by the commissary service. Accordingly, at step 217, the system compares a current time to the designated or predetermined time for processing orders $T_p$. If the current time is not equal to $T_p$, the system continues to store the pending orders at step 214 and continues to collect orders at step 208.

If at step 217 the current time is equal to the predetermined time for processing orders $T_p$, the system proceeds to validate the pending orders at steps 218 and 220. That is, the system proceeds to validate orders at the time $T_p$ even though they were previously validated at steps 210 and 212 at the time of submission by the inmate. Validation at time $T_p$ provides an opportunity to once again review the order at a subsequent point in time to when the order was submitted to see if restrictions in place at time $T_p$ prevent fulfillment of the order at time $T_p$. Alternatively stated, changes or adjustments in restrictions between a time of submission $T_s$ of an order and a time of processing $T_p$ of the order for acceptance will be reflected in the validation at time $T_p$ but not at time $T_s$. Thus, the system will, due to applicable correctional facility restrictions placed upon an inmate in the interval of time between $T_s$ and $T_p$, prevent an inmate from ordering an item that would violate a restriction, sometimes referred to as a restricted item, both at the time of order submission and at a later point in time prior to approval and delivery of the item by the commissary. Such two-step validation of orders, unlike existing commissary systems for correctional facilities, accounts for changes in applicable restrictions between order submissions and item delivery, and ensures that inmates may not receive items that did not violate restrictions at the time of ordering, but that do violate restrictions at the time of receipt.

If at step 220 a pending order violates item or quantity restrictions of the correctional facility at the time $T_p$, it is determined to be an invalid order and the purchase price of the restricted item or items is credited back to the inmate from the reserve made when the order was submitted. An invalid order is rejected and ignored by the system at step 216 and the system does not undertake further processing of the invalid order. The system may, however, log invalid pending order requests for analysis purposes as an indicator of system performance or as a monitoring tool for inmate activity on the system.

If at step 220, pending orders are determined to comply with applicable restrictions, and assuming that the inmate has a sufficient spending account balance for the ordered items, the order is valid and is accepted by the system at step 222 for final processing and delivery to inmates at step 224. Approved orders are appropriately debited from inmate spending accounts once the orders are approved.

At steps 218 and 220, it may occur that an order containing several items or more may be found to be partly valid for some of the items and partly invalid for other of the items. In such a situation, the system may approve the order to the extent that it is valid and indicate to the inmate, for example on an inmate receipt, the reason the invalid portion of the order was restricted.

FIGS. 4-9 illustrate portions of an exemplary flowchart algorithm and script for an exemplary embodiment of the system and processes shown in FIGS. 1-3 wherein the inmate is guided with voice prompts through the commissary order process and is orally advised of certain information. In the algorithm shown, the system is configured to respond to dual tone multifrequency (DTMF) signals, sometimes referred to as touch tone signals, when an inmate places a call to the system and makes input selections by pressing the numeric keypad of a telephone. It is contemplated, however, that the system could alternatively respond to other feedback inputs and signals from an inmate, including but not limited to voice commands from the inmate, and as another example, it is contemplated that the system could be implemented with other audio communications apart from a phone. The algorithm shown in FIGS. 4-9 is therefore provided solely for purposes of illustration rather than limitation, and it is understood that the system and processes shown in FIGS. 1-3 could be implemented with other algorithms and scripts while achieving similar advantages and benefits.

Figure 4:
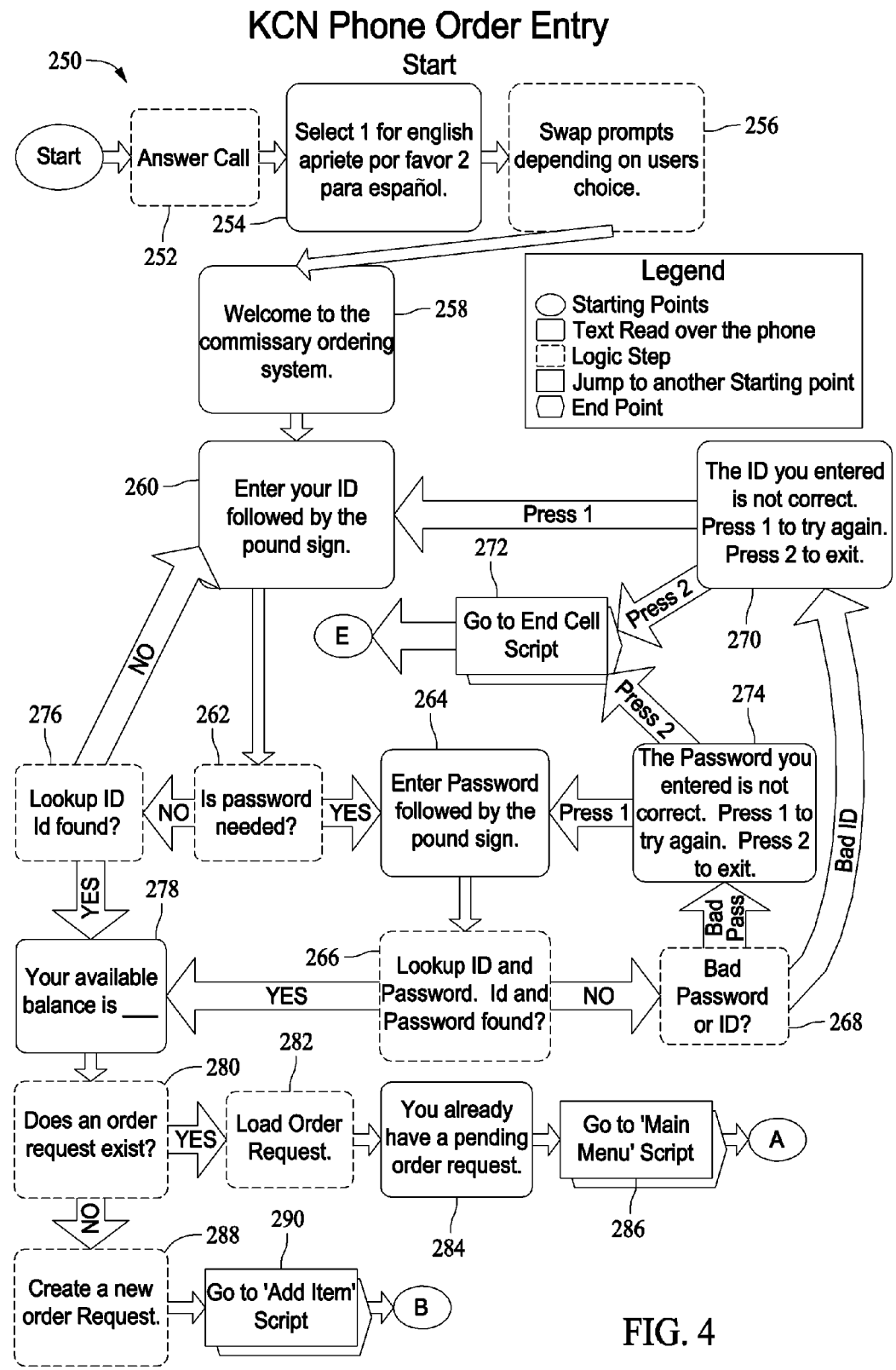

FIG. 4 illustrates a logon and initialization script portion and processes 250 that may be embodied in the IVR interface system of the invention. When an inmate places a call to the IVR system interface using a designated number or extension, for example, to communicate with the system, the system answers the call or communication at step 252. At step 254, the system prompts the user to make a language selection for interacting with the system, such as prompting the user to select 1 for English and select 2 for Spanish. That is, in one embodiment, the system is configured with voice prompts in more than one language to accommodate the preferences of different users, although this is by no means required and may be omitted in another embodiment of the invention.

Furthermore, the use of a telephone keypad to input a selection is only an example of a possible method of making selections to the IVR interface system of the invention. Optionally, standard analog caller ID technology contains identifying information that the IVR interface system can apply to identify an inmate, should that phone interface only be accessible by one inmate. Also, other technologies such as voice over internet protocol (VOIP) include mechanisms that may allow for an inmate to be identified by the connection itself, eliminating the need for identification to be input by an inmate into the system.

At step 256, the language of the voice prompts used by the system is swapped, if necessary, in response to the inmate's response to the system at step 254. That is, following the illustrated example, in FIG. 4, if the inmate presses the 1 key on the phone at step 254 prompts in the English language are used, while if the inmate presses the 2 key on the phone at step 254 prompts in the Spanish language are used.

After any necessary swapping of responses at step 256, a welcome message is presented to the inmate at step 258, and at step 260 the system prompts the inmate to enter an inmate identification number provided by the correctional facility or the commissary service for ordering items from the commissary. The inmate identification number may match an inmate identification number used for other purposes at the correctional facility, or may be a specifically provided identification number for use with the commissary. The identification number may include as many digits as the correctional facility or the commissary chooses. As indicated in FIG. 4, the inmate is prompted to enter the pound sign after his or her identification number is entered using, for example, a telephone keypad.

Once the pertinent identification number is entered by the inmate at step 260, the system optionally checks to see if a password is required as step 262. A password may be supplied by the commissary facility or the correctional facility, or may be chosen by the inmate as an additional layer of security and identity verification for inmate user's of the system. The password may include a numeric sequence having a specified number of digits. If a password is required, the system prompts the inmate to enter the password followed by the pound sign at step 264.

After the inmate enters the password at step 264, the system compares at step 266 the entered identification number and password to identification numbers and passwords stored on the system for authorized inmates. If the identification number does not correspond to identification data stored on the system, the system indicates a bad identification number at step 268 and prompts the inmate at step 270 that the entered identification number is not correct. The system may store identification data in various ways, including but not limited to, storing a password in clear text, storing a reversible encrypted equivalent of a password, and storing a non-reversible calculation based on a combination of values including the password. At step 270, the user is also directed to press 1 to try and enter the identification number again, or to press 2 to exit the system. When the user presses the 1 key the system returns to step 260 and prompts the user to enter an identification number followed by the pound sign. If the user presses the 2 key the system calls at step 272 an end call script explained below in relation to FIG. 9.

If at step 266 the entered password does not match a password stored on the system for the associated identification number entered by the inmate, a bad password is indicated at step 268 and the system prompts the inmate at step 274 that the entered password is not correct. The user is also directed at step 274 to press 1 to try and enter the password again, or to press 2 to exit the system. When the user presses the 1 key the system returns to step 264 and prompts the user to enter the password followed by the pound sign. If the user presses the 2 key the system calls at step 272 the end call script.

If at step 262 a password is not required to access the system, the system compares at step 276 the entered identification number to identification numbers stored on the system for authorized inmates. If the identification number does not match one of the identification numbers stored on the system, the system returns to step 260 and prompts the user to enter an identification number followed by the pound sign.

If at step 276 the entered identification number matches an identification number for an authorized user that is stored on the system, or alternatively if the entered identification number and password are found on the system at step 266, the system reports an available spending account balance to the user at step 278. The system then proceeds at step 280 to determine, using the logon identification number and password from steps 260 or 264, whether a pending order exists on the system for the inmate placing the call. If a pending order exists, the system loads the order at step 282 and notifies the inmate that the pending order exists at step 284. After notifying the inmate of the pending order at step 284, the system calls a main menu script at step 286.

If at step 280 no pending order is found for the inmate placing the call with an identification number and password at steps 260 or 264, the system proceeds to create a new order request at step 288 and to call an add item script at step 290.

Figure 5:
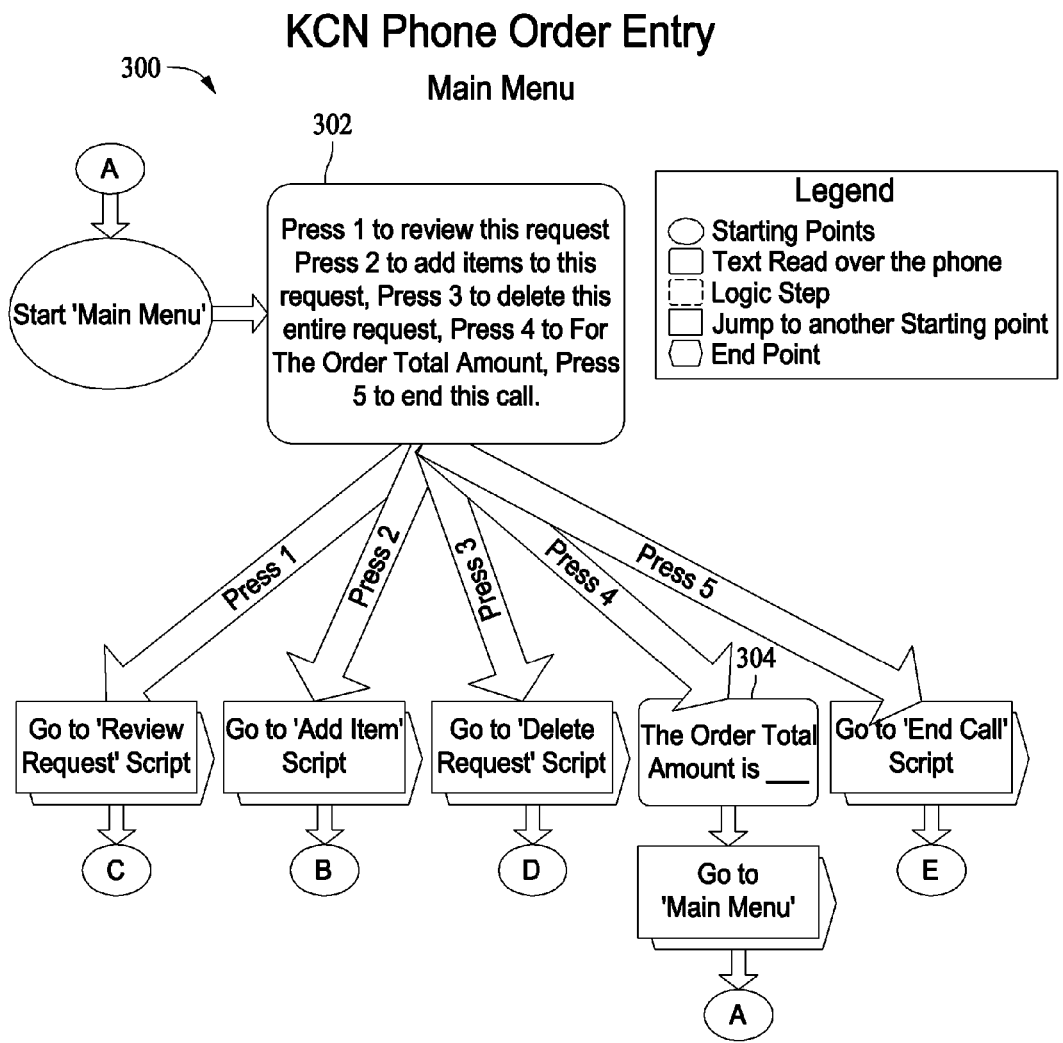

FIG. 5 illustrates a main menu script portion and processes 300 wherein at step 302 the inmate is prompted to press 1 to review a pending order, press 2 to add items to the pending order, press 3 to delete the entire pending order, press 4 to hear the total order price amount, or press 5 to end the call. As indicated in FIG. 5, when the inmate presses 1 the review request script is called, when the inmate presses 2 the add item script is called, when the inmate presses 3 the delete request script is called, when the inmate presses 4 the system reports the order price to the inmate at step 304 and returns to step 302, and when the inmate presses 5 the system calls the end call script.

Figure 6:
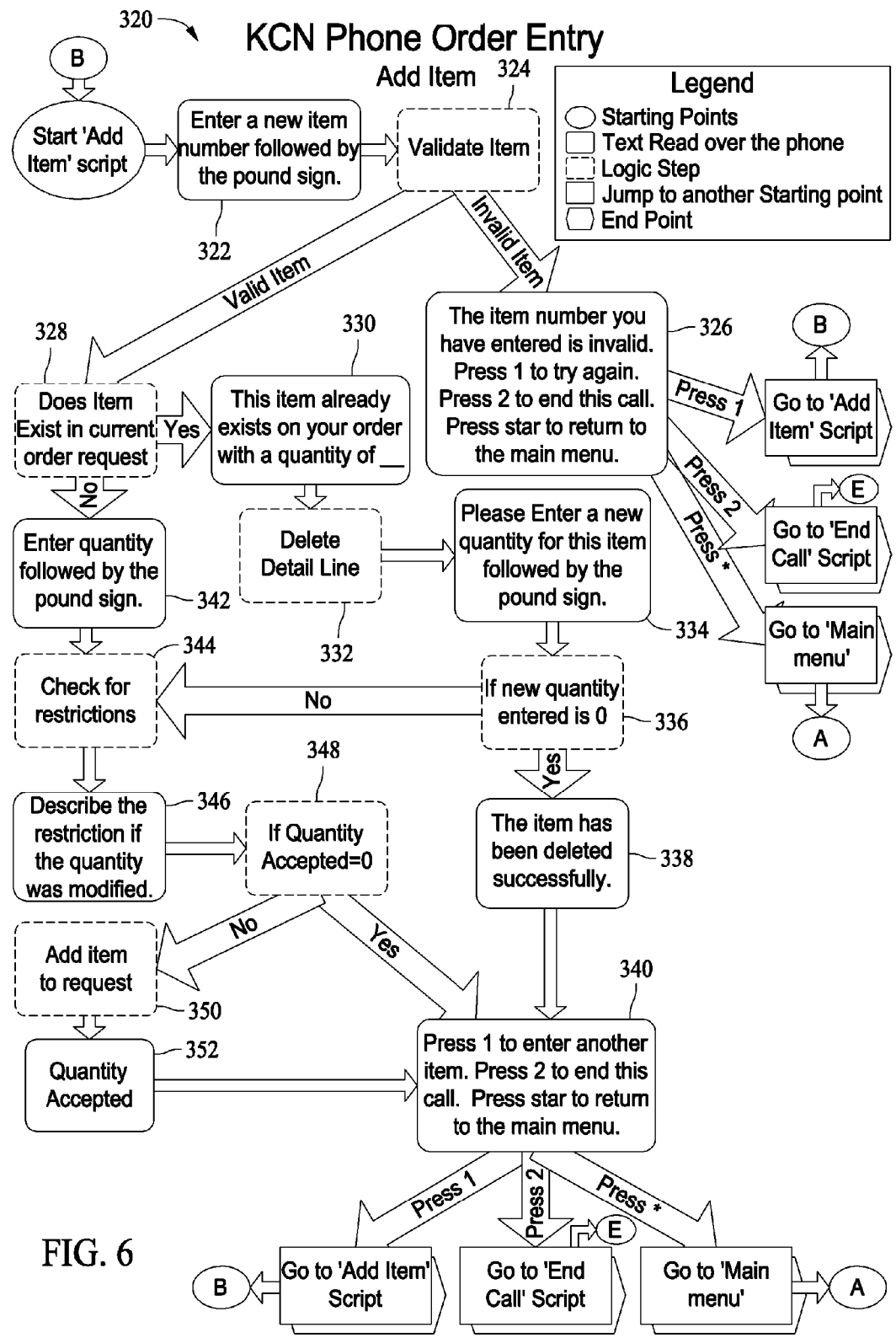

FIG. 6 illustrates the add item script portion and processes 320 wherein the user is prompted at step 322 to enter a new item number followed by the pound sign. The item number may be found by the inmate in a catalogue, list, or other source provided to the inmate for ordering items. After the inmate enters the item number at step 322, the system validates the item number at step 324 by comparing the item number to the item numbers stored on the system that are available for purchase through the commissary. If the entered item number does not match one of the item numbers stored on the system, the system determines the item number to be invalid, and at step 326 informs the inmate that the item number is invalid and prompts the inmate to press the 1, 2, or star key to respectively try again, end the call, or return to the main menu. If the inmate presses 1 the system returns to step 322 and prompts the user to enter an item number. If the inmate presses 2, the system calls the end call script. If the inmate presses the star key the system returns to step 302 in the main call script of FIG. 5.

If the entered item number does match one of the item numbers stored on the system, the system determines the item number is valid, and at step 328 compares the item number with the pending order items to see if the item exists in the pending order. If so, the system notifies the inmate at step 330 that an order for the item presently exists in the pending order, and the quantity of the item in the pending order. At step 332, the order deletes the item detail from the pending order, and prompts the user at step 334 to enter a new quantity for the item followed by the pound sign. At step 336 the system checks to see whether the quantity entered by the user is a zero or nonzero value.

If the new quantity entered by the user at step 334 is zero, the system accepts the entry as a request to delete the item from the order and informs the user at step 338 that the item has been deleted. At step 340 the system prompts the inmate to press the 1, 2, or star key to respectively add another item, end the call, or return to the main menu. If the inmate presses 1 the system returns to step 322 and prompts the user to enter an item number. If the inmate presses 2, the system calls the end call script. If the inmate presses the star key the system returns to step 302 in the main call script.

If at step 328 the valid item number does not exist in the pending order, the system prompts the inmate to enter the quantity for the item followed by the pound sign at step 342. When the item number is entered, and also when the new item quantity is a nonzero value at step 336, the system at step 344 checks the item number and quantity against applicable correctional facility restrictions to see whether the requested order violates a restriction. If the new quantity entered at step 334 causes a violation of one of the restrictions, the system at step 346 describes and explains the restriction to the inmate. If an inmate violates a quantity restriction, for example, by ordering more of an item than permitted, the system may modify the quantity of the item at step 346 such that the quantity no longer violates the applicable restriction. The system will notify the inmate of the restriction and of the quantity of the item that was accepted.

Also, for item quantities at step 342 that did not result in a violation of a restriction, the system at step 348 determines if the entered quantity is a zero or nonzero value. If the entered quantity is zero, the system returns to step 340 to prompt the inmate to press the 1, 2, or star key to respectively add another item, end the call, or return to the main menu.

If at step 348 the entered item quantity is not zero, the system 350 adds the item to the pending order and advises the inmate at step 352 that the quantity has been accepted. The system then returns to step 340 to prompt the inmate to press the 1, 2, or star key to respectively add another item, end the call, or return to the main menu.

Figure 7:
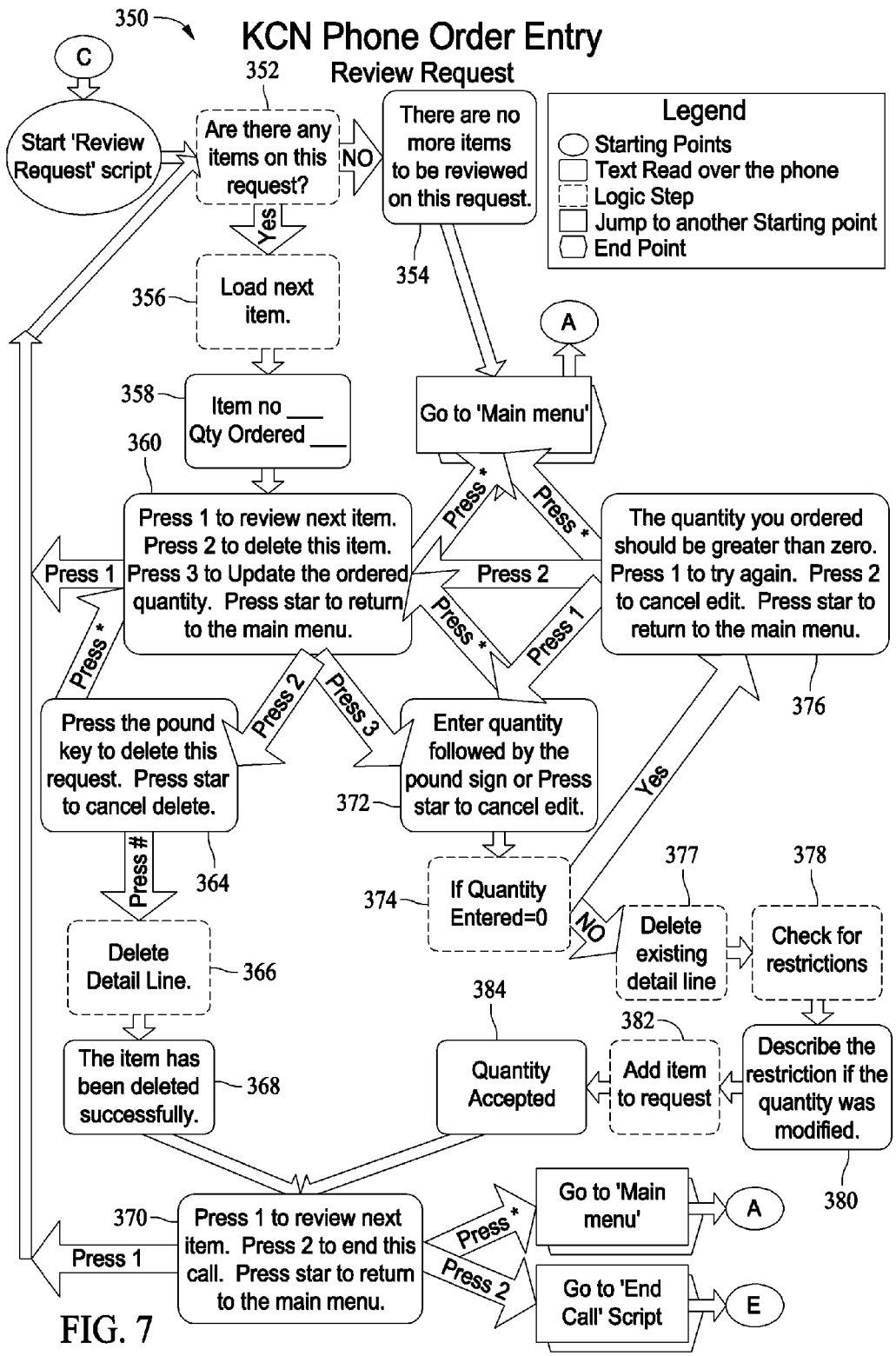

FIG. 7 illustrates a review request script portion 350 and processes that may be selected by the inmate at step 302 of FIG. 5. The review request script allows the inmate to review all items in the order and quantities for the items to ensure that the order is accurately captured by the system, and also allows the inmate to edit and update orders to correct mistakes and inadvertent errors.

In the review request script, the system determines whether there are items to review when the inmate initiates the script. If there are not items to review, the system advises the inmate of the same at step 354, and the system returns to the main menu script of FIG. 5.

If there are items to review when the inmate initiates the script to review an order, the system loads an item at step 356 and reports the item number and quantity ordered to the inmate at step 358. At step 360, the system prompts the inmate to press 1 to review the next item in the order, press 2 to delete the item from the order, press 3 to update the ordered quantity, or press the star key to return to the main menu. If the user presses the 1 key, the system returns to step 352 to see if there is an additional item to review, and either proceeds to step 354 if there is no additional item, or to steps 356 and 358 if there is an additional item. Thus, by pressing the 1 key at step 360, the inmate may successively review all items contained in an order.

If the inmate presses the 2 key to delete the most current item at step 360, the system confirms the request to delete the item at step 364 by prompting the inmate to press the pound key to delete the item or press the star key to cancel the request to delete the item. If the inmate presses the star key in response, the system returns to step 360. Alternatively, if the user presses the pound key at step 364, the system deletes the item from the order at step 366 and confirms to the inmate that the item has been deleted at step 368. At step 370, the system then prompts the inmate to press 1 to review the next item, press 2 to end the call, or press the star key to return to the main menu. If the inmate presses 1, the system returns to step 352, and if the user presses the 2 key or the star key, the system calls the end call script or the main menu script as indicated in FIG. 7.

If the inmate presses the 3 key at step 360 to update the ordered quantity for the current item reported at step 358, the system prompts the inmate at step 372 to enter the updated quantity followed by the pound sign or press the star key to cancel the update. If the inmate presses the star key in response, the system returns to step 360. If a quantity is entered, the system at step 374 determines whether the entered quantity is a zero or nonzero value. If the quantity entered was zero, the system at step 376 advises the user of the entry of an invalid quantity and prompts the user to press 1 to try again, press 2 to cancel the update, or press star to return to the main menu.

If a nonzero quantity value was entered by the inmate at step 372, the system deletes the existing quantity from the order at step 377, and at step 378 determines whether the newly entered nonzero quantity value entered at step 374 violates a restriction of the correctional facility. At step 378 the system checks the item number and quantity against applicable correctional facility restrictions to see whether the newly entered quantity violates a restriction. If the new quantity entered at step 372 causes a violation of one of the restrictions, the system at step 380 describes and explains the restriction to the inmate.

Also, for item quantities at step 378 that did not result in a violation of a restriction, the system at step 382 adds the new item quantity to the order and reports to the user that the quantity has been accepted at step 384. The system then returns to step 370 and prompts the inmate to press 1 to review the next item, press 2 to end the call, or press the star key to return to the main menu. If the inmate presses 1, the system returns to step 352, and if the user presses the 2 key or the star key, the system calls the end call script or the main menu script as indicated in FIG. 7.

Figure 8:
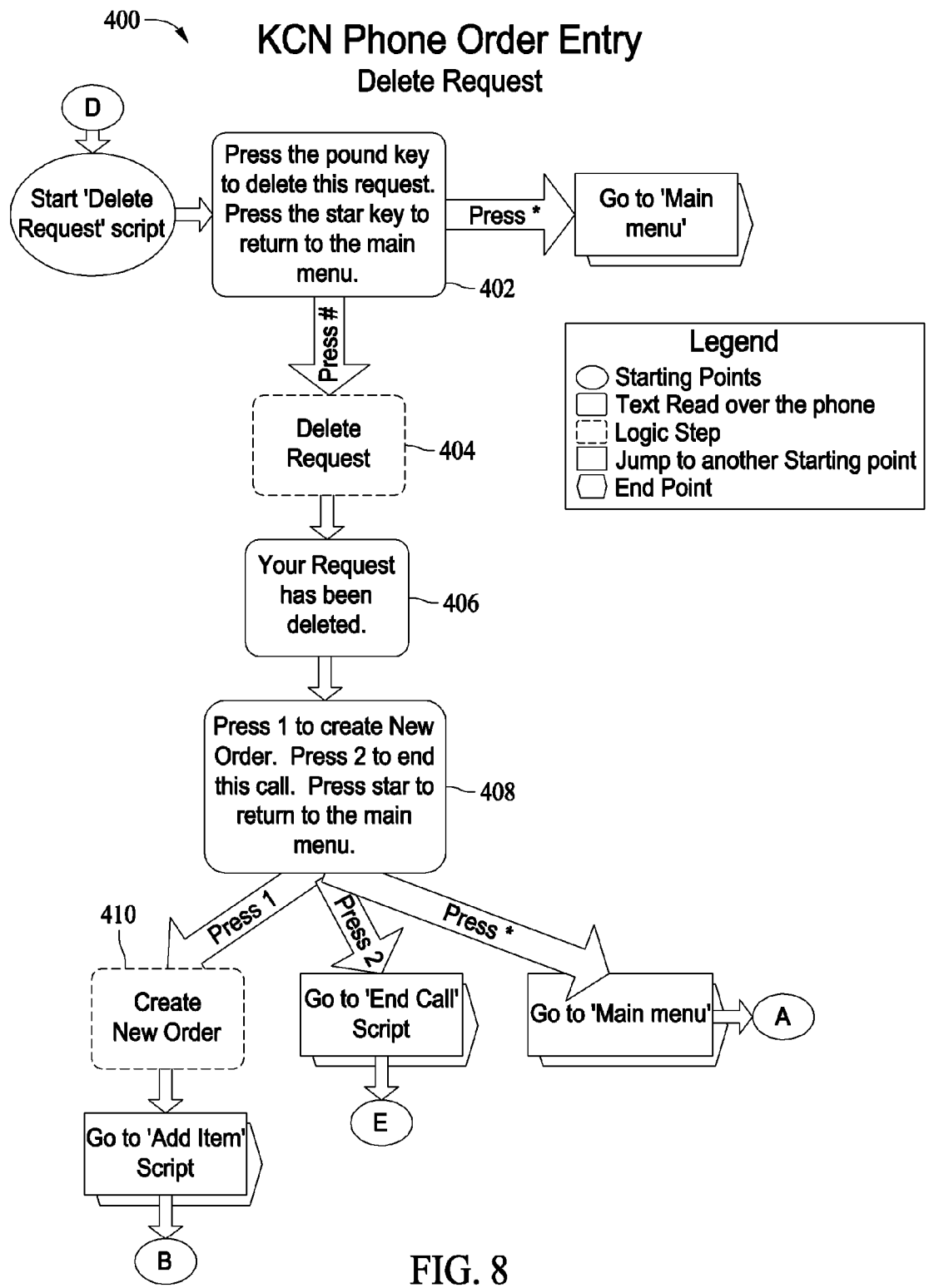

FIG. 8 illustrates a delete request script portion and processes 400 that may be called by the main menu script of FIG. 5. In the delete request script portion, the inmate is prompted by the system at step 402 to press the pound key to delete the current order request or press the star key to return to the main menu. If the inmate presses the pound key in response, the system deletes the request at step 404 and confirms that the request has been deleted at step 406. The system then prompts the inmate at step 408 to press 1 to create a new order, press 2 to end the call, and press the star key to return to the main menu. If the user presses the 1 key in response, the system proceeds to create a new order at step 410 and to call the add new item script of FIG. 6. If the inmate alternatively presses the 2 key or the star key in response to the prompt at step 308, the system calls the end call script of FIG. 9 or the main menu script of FIG. 5.

Figure 9:
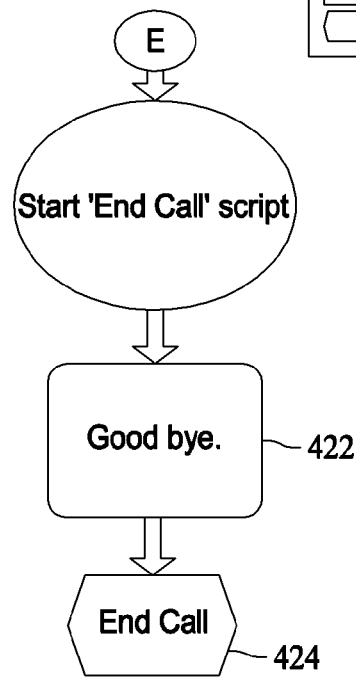
Figure 9:
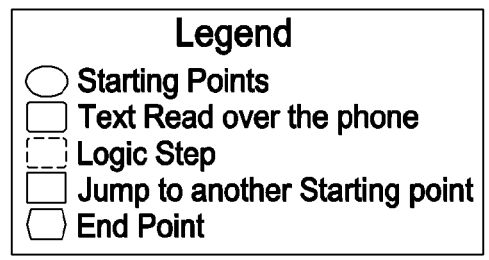

FIG. 9 illustrates an end call script and processes 420 that may be called in various portions of the algorithm wherein the system presents a goodbye message at step 422 and terminates the call at step 424.

The script algorithm shown in FIGS. 4-9 is believed to be advantageous in several aspects in comparison to conventional IVR systems for correctional facility commissaries. For example, the algorithm allows only one order per inmate at any given time to exist. Consequently, and unlike conventional systems inmates are not as likely to be confused regarding what they may have recently ordered or may not have ordered.

Additionally, the ability of the inmate to comprehensively review and edit orders, whether new or pending, allows for simple correction of mistakes, without deleting or cancelling entire orders, which saves time and reduces frustration incurred by inmates placing orders.

Still further, and as demonstrated above, the system advises and explains of restrictions that may apply to certain purchase orders, providing useful information to inmates regarding why certain orders are not allowed.

Validation of orders at the time of ordering, or the time of updating or editing of orders as demonstrated in FIGS. 3-9, and also at or near the time of final approval and delivery of items by the commissary as explained in relation to FIG. 3, avoids problems of existing systems that apply facility restrictions only at the time orders are submitted by inmates.

These and other benefits and advantages of the system and methods disclosed are now believed to be amply demonstrated. Having now described various exemplary operating algorithms functionally in relation to FIGS. 3-9, programming of the modules to operate in the manner described may be conventionally provided by those in the programming arts without further explanation. That is, the functionality of the algorithms may be implemented in program code segments, using one of a variety of known computer programming languages, executable by the hardware processing components of the system.

While the invention has been described in terms of various specific embodiments, those skilled in the art will recognize that the invention can be practiced with modification within the spirit and scope of the claims.

What is claimed is:

1. An interactive voice response interface for accepting orders from an inmate population in a correctional facility for items approved by the correctional facility and offered to the inmate population by a commissary service, the commissary service being subject to applicable order restrictions determined by the correctional facility, the order restrictions preventing selected inmates from purchasing certain items from the commissary service that are otherwise available for purchase by the inmate population; the interface comprising:
   a computer configured to:
      receive an incoming communication from an inmate to the commissary service;
      in response to the incoming communication, provide voice prompts to the inmate for ordering at least one item from the commissary service;
      receive an order submitted from the inmate for at least one item from the commissary service during the incoming communication;
      subject the received order to the applicable order restrictions in existence at a first point in time during the incoming communication;
      store the received order if it does not violate the applicable order restrictions at the first point in time;
      apply the applicable order restrictions to the stored order at a second point in time after termination of the incoming communication; and
      determine whether applicable restrictions in existence at the second point in time prevent fulfillment of the delivery of the accepted order to the inmate.

2. The interface of claim 1, wherein the computer is further configured to
   utilize dual tone multifrequency signals to accept input selections from the inmate and,
   in response to the accepted input selections, provide voice prompts to the inmate that are responsive to the accepted input selections.

3. The interface of claim 1, wherein the computer is further configured to:
   review each received order; and
   determine a status of each received order as valid or invalid per the applicable order restrictions in existence at the first point in time during the incoming communication.

4. The interface of claim 3, wherein the computer is further configured to report an invalid received order to the inmate with explanation.

5. The interface of claim 1, wherein the computer is further configured to:
   store a plurality of received orders from a plurality of incoming communications associated with a plurality inmates, wherein each of the plurality of stored orders do not violate the applicable order restrictions at the respective first point in time for each respective one of the plurality of incoming communications;
   accumulate the stored plurality of orders as each respective one of the incoming communications is concluded; and
   delaying final approval of the accumulated stored plurality of orders until a predetermined time wherein the accumulated orders are each processed to determine whether applicable restrictions in existence at the predetermined time prevent fulfillment of the delivery of the accepted orders, the second point in time corresponding to the predetermined time.

6. The interface of claim 5, wherein the computer is further configured to review each of the accumulated orders and determine a status of each order as valid or invalid per the applicable order restrictions in existence at the predetermined time.

7. The interface of claim 6, wherein the computer is further configured to reject orders that are determined to be invalid at the predetermined time.

8. The interface of claim 7, wherein the computer is further configured to initiate delivery of finally approved orders to the inmate that are determined to be valid at the predetermined time.

9. The interface of claim 1, wherein the computer is further configured to:
   in response to the incoming communication from an inmate, notify the inmate of an existence of a previous and pending order placed by the inmate.

10. The interface of claim 1, wherein the computer is further configured to report to the inmate a current balance of an inmate spending account for purchasing of items from the commissary service.

11. The interface of claim 1, wherein the computer is further configured to permit the inmate to edit an order for an item without cancelling the order.

12. The interface of claim 1, wherein the computer is responsive to voice commands to accept input selections from the inmate and, in response to the input selections, provides voice prompts to the inmate.

13. An interface system for accepting orders from an inmate population in a correctional facility to a commissary offering approved items for purchase by the inmate population; the system comprising:
   at least one interactive voice response system configured to accept an incoming communication from an inmate for ordering of an item from the commissary, the interactive voice response system configured to provide voice prompts to the inmate for ordering the item; and
   a database configured to store completed orders from the inmate through the interactive voice response system as pending orders until a predetermined time subsequent to termination of the incoming communication;
   wherein in response to each incoming communication from an inmate, the interactive voice response system is configured to search the database for a pending order submitted by the inmate associated with the incoming communication, and to notify the inmate of a pending order located in the database;
   wherein the commissary is subject to restrictions determined by the correctional facility for purchasing of certain items by selected inmates, the database including data and information corresponding to restrictions for each inmate that is eligible to order an item from the commissary; and
   wherein the applicable restrictions are applied by the interactive voice response system at a first point in time as orders for items from the commissary are completed by an inmate during an incoming communication accepted by the interactive voice response system; and
   wherein the applicable restrictions are also applied at a second point in time by the interactive voice response system to determine the whether applicable restrictions in existence at the second point in time prevent fulfillment of the delivery of the pending order to the inmate.

14. The interface of claim 13, wherein the interactive voice response system is further configured to:
   provide a prompt to the inmate to review the pending order; and
   when the inmate elects to review the pending order, to report the contents of the pending order for the inmate.

15. The interface of claim 14, wherein the interactive voice response system is further configured to:
   provide a prompt to the inmate to edit the pending order.

16. The interface of claim 13, wherein the interactive voice response system is further configured to:
   provide a prompt to the inmate to enter an item selection;

provide a prompt to the user to enter a quantity for the selected item; and provide a prompt to the inmate to edit one of the item selection and the item quantity without cancelling the order.

17. The interface of claim 16, wherein the interactive voice response system is further configured to notify an inmate when an item selection corresponding to a restricted item is entered by the inmate.

18. The interface of claim 13, wherein the interactive voice response system is responsive to dual tone multifrequency signals to accept input selections from the inmate and to provide voice prompts to the inmate in response to the input selections.

19. The interface of claim 13, wherein the interactive voice response system is further configured to report to the inmate a current balance of an inmate spending account for purchasing of available items from the commissary service.

20. The interface of claim 13, wherein the interactive voice response system is responsive to voice commands to provide voice prompts to the inmate.

21. An interactive voice response system for accepting orders from an inmate population in a correctional facility from a commissary offering items for purchase to the inmate population, wherein the commissary service is subject to restrictions determined by the correctional facility on purchasing of certain items by selected inmates, the system comprising:

a processor based device;

an interactive voice response module coupled to the processor based device and configured to accept an incoming communication from an inmate for submitting an order for an item from the commissary, the interactive voice response module adapted to provide voice prompts to the inmate for an item selection and an item quantity;

a database coupled to the processor based device and to the interactive voice response module, the database containing data and information corresponding to the restrictions for purchasing of certain items by selected inmates and the database including inmate identifier data for each inmate that is eligible to order items from the commissary;

wherein the processor based device is configured to compare an inmate identifier collected via the interactive voice response module to data and information in the database to determine that the inmate is authorized to order items from the commissary;

wherein the processor based device is further configured to, at a first point in time as the order is submitted during an incoming communication and also at a second point in time subsequent to the first point in time and after the incoming communication has ended, compare the inmate identifier collected via the interactive voice response module to data and information in the database corresponding to order restrictions for the inmate associated with the collected inmate identifier, wherein the second point in time is independent of any action by the inmate and determines whether applicable restrictions in existence at the second point in time prevent fulfillment of the delivery of the pending order to the inmate.

22. The system of claim 21, wherein the interactive voice response module is responsive to dual tone multifrequency signals to accept input selections from the inmate and to provide voice prompts to the inmate corresponding to the input selections.

23. The system of claim 21, wherein the system is further configured to permit the inmate to edit an order for an item without cancelling the order.

24. The system of claim 21, wherein submitted orders for item selections and item quantities collected from the interactive voice response module are stored in the database as pending orders until a predetermined time selected by the correctional facility to process pending orders for acceptance and delivery of ordered items.

25. The system of claim 21, wherein the processor based device is further configured to compare, with each incoming communication from an inmate, an inmate identifier collected via the interactive voice response module with pending orders stored in the database, and if the inmate identifier matches one of the pending orders, to notify the inmate via the interactive voice response module of the pending order.

26. The system of claim 21, wherein the processor based device is further configured to prompt the inmate via the interactive voice response to review the pending order.

27. The system of claim 26, wherein the processor based device is further configured to prompt the user via the interactive voice response module whether to add an item to the stored order.

28. The system of claim 26, wherein the processor based device is further configured to prompt the user via the interactive voice response module whether to edit the pending order without canceling the order.

29. The system of claim 21, wherein the interactive voice response module is responsive to voice commands to accept input selections from the inmate and to provide voice prompts to the inmate corresponding to the input selections.

30. The system of claim 21, wherein submitted orders for item selections and item quantities collected from the interactive voice response module are stored in the database as pending orders until the correctional facility initiates processing pending orders for acceptance and delivery of ordered items.

31. A method of processing orders received from an inmate population in a correctional facility for items offered by a commissary using an interactive voice response interface and a database, the purchase of items from the commissary being subject to order restrictions determined by the correctional facility to prevent selected inmates from ordering certain items, the restrictions being subject to change over time, the method comprising:

receiving an inmate identifier from an inmate with the interactive voice response interface during an incoming communication;

comparing the received inmate identifier to inmate identification data stored in the database during the incoming communication to determine whether the inmate is authorized to submit an order from the commissary;

receiving orders for items submitted by authorized inmates in incoming communications using the interactive voice response interface;

applying the restrictions as the orders are submitted in each incoming communication to determine whether the submitted orders are valid or invalid;

storing the submitted orders that are determined to be valid as pending orders in the database until a predetermined time selected by the facility for collectively reviewing the pending orders, the predetermined time being independent of any incoming communication;

applying the restrictions to the pending orders at the predetermined time to determine whether the pending orders are valid or invalid to determine whether applicable restrictions in existence at the second point in time prevent fulfillment of the delivery of the pending orders to the respective inmates;

accepting the pending orders that are determined to be valid at the predetermined time; and processing the accepted orders for delivery.

32. The method of claim 31, further comprising:
prompting each inmate to enter an identifier as each order is submitted;
comparing the identifier to the pending orders;
if a pending order is found that matches the identifier, notifying the inmate of a pending order; and
permitting the inmate to modify the pending order if desired.

33. The method of claim 32 wherein modifying the pending order comprises one of:
deleting an item from the pending order;
adding a new item to the pending order; and
changing an item quantity in the pending order.

34. The method of claim 33, further comprising:
applying the restrictions when an item quantity is changed in a pending order; and
notifying the inmate when a restriction prohibits the changed item quantity.

35. The method of claim 31, further comprising:
permitting the inmate to edit a submitted order without cancelling the submitted order.

36. The method of claim 31, further comprising receiving and storing an update to the stored restrictions at a time after the orders are collected and before the predetermined time.

37. A computer program embodied on a non-transitory computer readable medium for processing orders for items from a commissary by inmates in a correctional facility, the program comprising:
at least one code segment that:
receives an inmate identifier from an inmate;
compares the inmate identifier to inmate identification data stored in the database to determine whether the inmate is authorized to order from the commissary;
receives user provided selections from an authorized inmate for items offered by the commissary, and;
in response to the received selections, evaluates the received selections in light of correctional facility restrictions on purchases of certain items from the commissary by selected inmates at the time that orders are received;
accumulates orders that are received that do not violate the restrictions until a designated time that orders are processed for acceptance and delivery, wherein the designated time is independent of any action of the inmate;
evaluates, at the designated time, the stored orders in light of the correctional facility restrictions to determine whether applicable restrictions in existence at the designated time prevent fulfillment of the delivery of the accumulated orders; and
authorizes delivery of stored orders that do not violate the restrictions at the designated time.

38. The program of claim 37, further comprising at least one code segment that permits modification of a stored order.

39. The program of claim 37, further comprising at least one code segment that reports an accumulated order to the inmate.

40. The program of claim 37, further comprising at least one code segment that allows editing of an order without cancelling the order.

41. The program of claim 37, further comprising at least one code segment that explains a restriction violation to an inmate.

42. The program of claim 37, further comprising at least one code segment that reports a current spending account balance to an inmate.

43. The program of claim 37, wherein the code implements an interactive voice response interface.

44. The program of claim 43, wherein the code is responsive to dual tone multifrequency signals.

45. The program of claim 43, wherein the code is responsive to voice commands.

46. An interactive voice response interface for accepting orders from an inmate population in a correctional facility for a group of items, the items being approved by the correctional facility and offered to the inmate population by a commissary service; the interface comprising:
at least one computer configured to receive incoming communications from an inmate to the commissary service, and in response to the incoming communications the computer being adapted to provide voice prompts to the inmate for ordering commissary items;
wherein the incoming communications include an inmate identifier, wherein the at least one computer is configured to compare the inmate identifier to stored inmate identification data to determine if the inmate associated with the inmate identifier is authorized to order from the commissary service;
wherein the incoming communications also include data corresponding to an order for commissary items from the inmates;
wherein orders for commissary items are held from a time of submission at each incoming communication until a predetermined time independent of any incoming communication when the orders are processed as a batch for final acceptance and delivery;
wherein the commissary is subject to applicable inmate restrictions determined by the correctional facility, wherein selected inmates are prohibited from purchasing certain items from the commissary that are otherwise available for purchase by the inmate population; and
wherein the applicable inmate restrictions are applied at the time of submission during each incoming communication to determine whether each of the submitted orders are valid or invalid per the applicable inmate restrictions at the respective time of submission of each order; and
wherein submitted orders determined to be valid are again compared to the applicable inmate restrictions at the predetermined point of time and determined to be valid or invalid to determine whether applicable restrictions in existence at the predetermined point in time prevent fulfillment of the delivery of the pending orders to the respective inmates.

47. The system of claim 46, wherein the computer is responsive to dual tone multifrequency signals.

48. The system of claim 46, wherein the computer is responsive to voice commands.

49. A system for applying restrictions to a request for a privilege submitted by an inmate in a correctional facility, the restrictions determined by the facility and being subject to change over time, the system comprising:
a database adapted to store data corresponding to the applicable restrictions associated with the inmate; and
at least one processor based device coupled to the database and configured to:

receive a request for a privilege from the inmate in an incoming communication;

determine, upon receipt of the request and during the incoming communication, that the request does not violate the applicable restrictions;

store the received request as a pending request; and determine that the pending request does not violate the applicable restrictions at a time subsequent to the time of receipt and after the incoming communication has ended but prior to execution of the request to determine whether applicable restrictions in existence at the time subsequent prevent execution of the request.

50. The system of claim 49, wherein the restrictions prevent the inmate from accessing a privilege available to other inmates in an inmate population.

51. The system of claim 49, further comprising an interactive voice response module coupled to the at least one processor based device and configured to accept an incoming communication from the inmate for submitting a request for a privilege.

52. The system of claim 49, wherein the at least one processor based device is configured to receive a request for an item offered for sale by a commissary service.

53. A system for administering transactions in a correctional facility between an inmate and an approved provider, wherein during a communication with the inmate the system receives a transaction request from the inmate before terminating the communication, said system comprising:

a database adapted to store data corresponding to the applicable restrictions associated with the inmate; and at least one processor based device coupled to the database for comparing the transaction request submitted by the inmate during the communication to the applicable restrictions at more than one point in time, and at least one of the more than one point in time occurring independently of any incoming communication from the inmate to determine whether applicable restrictions at a subsequent point in time prevent fulfillment of the transaction request.

54. The system of claim 53, wherein the transaction request comprises a privilege preapproved by the correctional facility to be offered to the inmate by the approved provider.

55. The system of claim 54, wherein the privilege comprises an order that includes an item offered for sale by the approved provider.

56. The system of claim 54, wherein the restrictions associated with the inmate are imposed by the correctional facility and prevent the inmate from accessing a privilege available to other inmates in an inmate population.

57. The system of claim 53, further comprising an interactive voice response module coupled to the at least one processor based device and configured to facilitate the communication.

58. The system of claim 53, wherein the at least one processor based device is configured to compare the transaction request submitted by the inmate at a first time prior to terminating the communication and at a second time subsequent to terminating the communication.

59. The system of claim 53, wherein the restrictions associated with the inmate are subject to change over time.

* * * * *